(12) United States Patent  
MacKnight

(10) Patent No.: US 7,870,717 B2
(45) Date of Patent: Jan. 18, 2011

(54) ADVANCED HYDROGEN AUXILIARY POWER UNIT

(75) Inventor: Allen K. MacKnight, Signal Hill, CA (US)

(73) Assignee: Honeywell International Inc., Morristown, NJ (US)

( * ) Notice: Subject to any disclaimer, the term of this patent is extended or adjusted under 35 U.S.C. 154(b) by 1243 days.

(21) Appl. No.: 11/681,990

(22) Filed: Mar. 5, 2007

(65) Prior Publication Data

US 2008/0066470 A1    Mar. 20, 2008

Related U.S. Application Data

(60) Provisional application No. 60/825,623, filed on Sep. 14, 2006.

(51) Int. Cl.
*F02C 3/20* (2006.01)
*F02C 6/18* (2006.01)
*F02C 7/32* (2006.01)

(52) U.S. Cl. ............... 60/39.12; 60/39.5; 60/39.511; 60/802

(58) Field of Classification Search ............ 60/39.5, 60/39.511, 39.12, 723, 802
See application file for complete search history.

(56) References Cited

U.S. PATENT DOCUMENTS

| | | | | |
|---|---|---|---|---|
| 5,896,738 A | * | 4/1999 | Yang et al. | 60/39.12 |
| 5,927,063 A | * | 7/1999 | Janda et al. | 60/39.12 |
| 5,968,680 A | * | 10/1999 | Wolfe et al. | 429/13 |
| 6,107,693 A | * | 8/2000 | Mongia et al. | 290/54 |
| 6,125,625 A | * | 10/2000 | Lipinski et al. | 60/723 |
| 6,223,519 B1 | * | 5/2001 | Basu et al. | 60/39.12 |
| 6,269,625 B1 | * | 8/2001 | Dibble et al. | 60/39.12 |
| 6,449,954 B2 | * | 9/2002 | Bachmann | 60/775 |
| 6,450,447 B1 | | 9/2002 | Konrad et al. | |
| 6,641,084 B1 | | 11/2003 | Huber et al. | |
| 6,834,831 B2 | | 12/2004 | Daggett | |
| 6,931,856 B2 | * | 8/2005 | Belokon et al. | 60/39.12 |
| 7,380,749 B2 | * | 6/2008 | Fucke et al. | 60/39.511 |
| 7,547,002 B2 | * | 6/2009 | Mao et al. | 261/78.1 |
| 7,597,739 B2 | * | 10/2009 | Kepplinger et al. | 75/450 |
| 2004/0182002 A1 | * | 9/2004 | Malhotra et al. | 48/198.7 |

* cited by examiner

*Primary Examiner*—Ted Kim
(74) *Attorney, Agent, or Firm*—Oral Caglar, Esq.

(57) ABSTRACT

An auxiliary power unit includes an autothermal reformer for producing a reformate from fuel; a turbine; a combustor for burning the reformate to power the turbine; a recuperator for obtaining thermal energy to improve the efficiency of the auxiliary power unit; a steam generator for using thermal energy from the recuperator to produce steam from a water supply; a condenser for recovering the water from turbine exhaust; and an electrical generator coupled to the turbine for producing electrical power. Recovered heat and water are used with the autothermal reformer to produce rapid and complete combustion of the fuel with a relatively low concentration of emissions.

10 Claims, 3 Drawing Sheets

ADVANCED HYDROGEN AUXILIARY POWER UNIT

CROSS-REFERENCE TO RELATED APPLICATION

The present application claims the benefit of U.S. Provisional Patent Application No. 60/825,623, filed Sep. 14, 2006.

BACKGROUND OF THE INVENTION

The present invention generally relates to electrical power generation systems and, more specifically, to an airborne turbine-powered electrical generator and fixed site power generation.

Many conventional electrical generation systems utilize a liquid fuel motor or turbine for primary power. A turbine-driven power system 10, such as may be used in an aircraft, is shown in FIG. 1. Liquid fuel, such as jet fuel 11 may be provided to a combustor 13 that serves to drive a turbine 15. The turbine operates a compressor 17 that may intake external ambient air, such as RAM air 21, and in turn provide compressed air 23 to the combustor 13. Generated electrical power 25 may be provided to a power distribution system 30 in the aircraft via an electrical generator 19 mechanically coupled to the turbine 15.

The problem with such conventional turbine-driven power systems is that polluting gases, such as nitrous oxide, and heat are typically present in the exhaust emission of the power system. One alternative to the conventional auxiliary power system is a fuel cell power system that chemically converts jet fuel to electrical energy. However, although a fuel cell power system may produce lower nitrous oxide (and other $NO_x$ gas) emissions than a turbine-driven power system, the fuel cell power system has limited application as a power source in a flight vehicle structure because the fuel cell power system operates with decreased efficiency at high altitudes.

U.S. Pat. No. 6,834,831 issued to Daggett discloses a power unit that includes a fuel cell and a waste burner for improving the efficiency and energy output of the power unit. In the device disclosed by Daggett '831, combustible fuel not consumed by the chemical process of the fuel cell is collected and burned by the waste burner to drive a turbine. However, the device is unnecessarily complex as both a fuel cell and a turbine are required to produce the desired results.

U.S. Pat. No. 6,641,084 issued to Huber et al. discloses a power unit that includes a fuel cell and a waste energy line to convey excess energy from the fuel cell to a turbine. U.S. Pat. No. 6,450,447 issued to Konrad et al. discloses a power unit that includes a fuel cell for generating electric energy and a gas turbine for generating compressed air for delivery to the fuel cell. Huber et al. '084 and Konrad et al. '447 also incorporate unnecessary complexity to their respective auxiliary power units, since both of the units comprise a fuel cell and a turbine to operate as disclosed.

As can be appreciated, there is a need for an improved apparatus and method for providing mobile electrical power generation while producing fewer emissions than conventional turbine-powered auxiliary power units.

SUMMARY OF THE INVENTION

In one aspect of the present invention, an auxiliary power unit comprises: a fuel reforming catalytic reactor for producing a reformate from a mixture of fuel, steam, and hot compressed air; a combustor for consuming the reformate and producing thermal energy thereby; a turbine powered by the combustor; an air compressor mechanically coupled to the turbine; and an electrical generator mechanically coupled to the turbine.

In another aspect of the present invention, an auxiliary power unit for producing electrical power from a fuel comprises: an autothermal reformer for producing a reformate from the fuel, the reformate including at least one of hydrogen, nitrogen, methane, carbon monoxide, carbon dioxide, and steam; a turbine disposed in a structure; a combustor for burning the reformate to power the turbine, the turbine for flowing turbine exhaust through a recuperator; an air compressor for providing compressed ambient air to the recuperator; the recuperator for conducting thermal energy from the turbine exhaust to the compressed ambient air, such that resultant hot compressed air is available to the combustor; a steam generator for receiving the turbine exhaust after expulsion from the recuperator, the steam generator further for transferring thermal energy from the turbine exhaust to a water supply to produce the steam; a condenser for receiving the turbine exhaust after expulsion from the steam generator, the condenser for cooling the turbine exhaust to produce the water supply; and an electrical generator mechanically coupled to the turbine for producing electrical power.

In yet another aspect of the present invention, a method for generating electricity in a system comprises: combining atomized fuel, hot pressurized gas, and steam in an autothermal reformer feed mixer; thermo-chemically converting the fuel, the hot pressurized air, and the steam into a reformate using a catalytic reactor; providing hot pressurized air and the reformate to a combustor; providing hot gas from the combustor to a turbine; and mechanically coupling the turbine to an electrical generator.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides an auxiliary power unit that may be mounted in a mobile structure such as a fixed-wing aircraft, a flight vehicle structure such as a helicopter, on the bed of a truck, or in a tank. Alternatively, the auxiliary power unit may be mounted in at fixed site for power generation such as residential homes, apartments, business structures such as stores, malls and other dining establishments, hospitals and remote off-the-grid sites. The auxiliary power unit may be configured to reduce emissions, without requiring a fuel cell, by operating with a conversion process efficiency of at least 37-72%.

In one embodiment of the present invention, the auxiliary power unit may include a fuel reforming catalytic reactor, such as an autothermal reformer, to produce a reformate from a hydrocarbon-based fuel, the reformate including a mixture of hydrogen, nitrogen, methane, carbon monoxide, carbon dioxide, and steam. The reformate may be combined with hot compressed air and fed to a combustor. The hot compressed air may be provided by an air compressor and heated by exhaust from a turbine, and the steam may be provided by exhaust condensate produced by the combustor, the condensate also heated by the turbine exhaust. In comparison to conventional auxiliary power unit designs which attempt to incorporate fuel cell technology to reduce emissions, the present invention utilizes an autothermal catalytic reactor to combine jet fuel with hydrogen, steam, and air to produce rapid and complete combustion of the fuel, where recovered heat and a water byproduct are used in the innovative reactive process.

Figure 1:
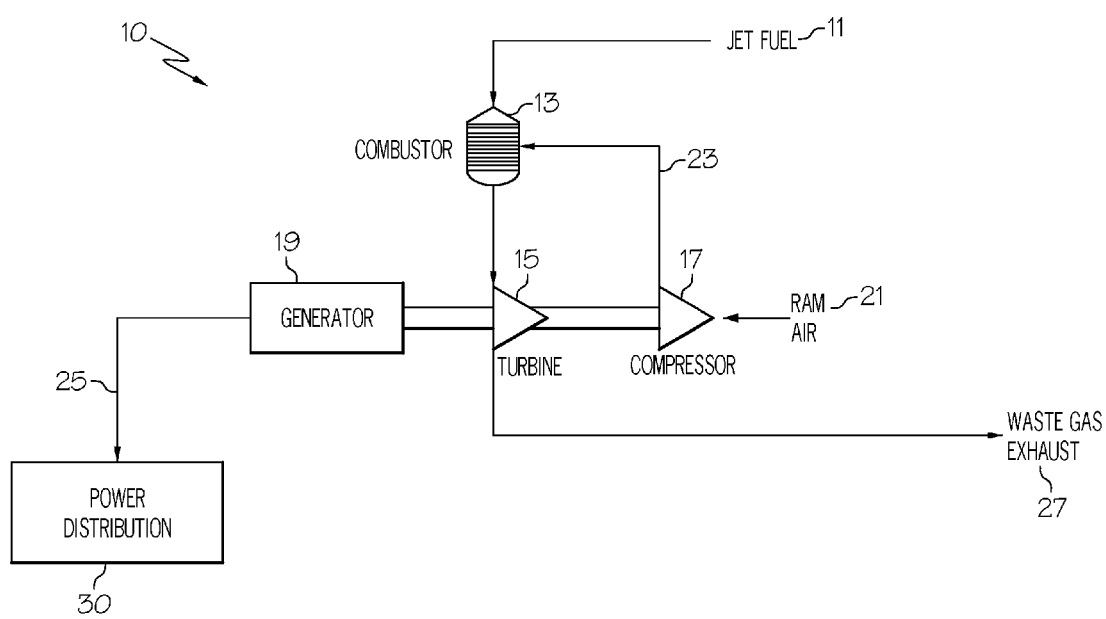
FIG. 1 is a diagram of a conventional turbine-powered electrical generation system, according to the prior art.
Figure 2:
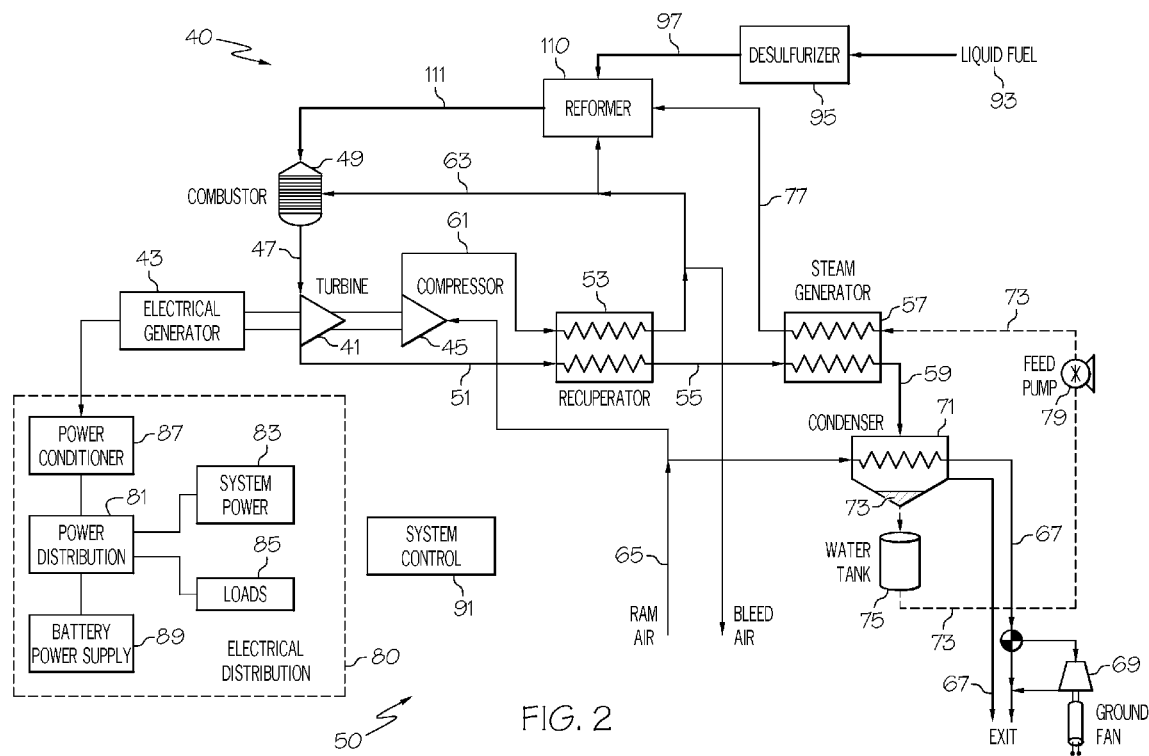
FIG. 2 is a functional diagram of a turbine-powered electrical generation system including an auxiliary power unit with a fuel reforming catalytic reactor to provide a hydrogen-enriched fuel, air, and steam mixture to a combustor, in accordance with the present invention.

There is shown in FIG. 2 a functional diagram of a turbine-powered electrical generation system 50 comprising a hydrogen auxiliary power unit 40 and an electrical distribution system 80, in accordance with the present invention. The hydrogen auxiliary power unit 40 may comprise a turbine 41 mechanically coupled to an electrical generator 43 and to an air compressor 45. Power to operate the turbine 41 may be provided by hot gas 47 produced by a combustor 49.

Hot turbine exhaust 51 may be sent to a recuperator 53. Some thermal energy maybe removed from the hot turbine exhaust 51 in the recuperator 53, as explained in greater detail below, to produce hot turbine air 55 that may be expelled from the recuperator 53. The hot turbine air 55 may be provided to a steam generator 57 where some thermal energy may be removed from the hot turbine air 55, as explained in greater detail below, to produce cooled air 59 that may be expelled from the steam generator 57.

The air compressor 45 may output compressed air 61 to the recuperator 53 where thermal energy may be imparted to the compressed air 61 from the hot turbine exhaust 51 by conduction, for example. In turn, the incoming compressed air 61 may be expelled from the recuperator 53 as hot compressed air 63 that may be provided to the combustor 49. External RAM air 65 may be provided to the air compressor 45, as is well know in the relevant art. By providing the hot compressed air 63 to the combustor 49, instead of the relatively cooler external RAM air 65, the thermal efficiency of the combustor 49 may be improved, and lower specific fuel consumption may be realized.

The external RAM air 65 may also be provided as a coolant to a condenser 71 that may operate to obtain liquid condensate from the cooled air 59. This condensation process may produce liquid water 73 that may be routed to a water tank 75 for storage. After passing through the condenser 71, the external RAM air 65 may be output as exhaust air 67 to be directly exhausted, or may be routed through a ground fan 69 before being exhausted. As can be appreciated by one skilled in the relevant art, there may be sufficient dynamic air pressure on a flight vehicle (not shown) during flight or at high speed on the ground to flow air through the condenser 71. Otherwise, the ground fan 69 may be used to provide cooling air to the condenser 71 when the hydrogen auxiliary power unit 40 is stationary on the ground.

Some of the liquid water 73 may be routed from the water tank 75 and provided to the steam generator 57 by a feed pump 79. In the steam generator 57, thermal energy may be transferred from the hot turbine air 55 to the liquid water 73 which may then be output from the steam generator 57 as steam 77. It can be appreciated by one skilled in the art that operation of the hydrogen auxiliary power unit 40 may produce liquid water 73 as a by-product, where the liquid water 73 may be necessary for proper operation of the hydrogen auxiliary power unit 40.

The hydrogen auxiliary power unit 40, therefore, may not require a continuous, externally-provided supply of water for proper operation. Under certain operating conditions, the hydrogen auxiliary power unit 40 may produce more liquid water 73 than is required for operation. In an aircraft or other mobile vehicle structure, the excess liquid water 73 may be used for hygiene flush water, humidification of cabin air, or potable water (after further processing), for example. Alternatively, in fixed site applications, the excess water may be used for irrigation, hygiene flush water, or potable water, after further processing.

Electrical power produced by the generator 43 may be provided to the electrical distribution system 80, such as may be found in an aircraft or other structure using hydrocarbon-based fuel. In an exemplary embodiment, the electrical distribution system may include a power distribution module 81 that operates to regulate and provide electrical power to vehicle system power 83 and to other vehicle electrical loads 85. There may be provided a power conditioner 87 between the generator 43 and the power distribution module 81. The power distribution module 81 may also operate to maintain a backup power supply 89, such as a battery, at or near full charge. The hydrogen auxiliary power unit 40 may also include a system control module 91 to regulate and control operation of the generator 43, the turbine 41, the air compressor 45, and the combustor 49.

Energy to operate the hydrogen auxiliary power unit 40 may be provided by a hydrocarbon-based liquid fuel 93, such as JP8 jet fuel, gasoline, Jet A jet fuel, or diesel fuel, delivered to the hydrogen auxiliary power unit 40 via a fuel reforming catalytic reactor, such as an autothermal reformer 110, described in greater detail below. Alternatively, the liquid fuel 93 may first be passed through a desulfurizer 95, as needed, so as to provide low-sulfur content fuel 97 to the autothermal reformer 110. As can be seen from the diagram, the liquid fuel 93 (or the low-sulfur content fuel 97), the steam 77, and the hot compressed air 63 may be delivered to the autothermal reformer 110.

Figure 3:
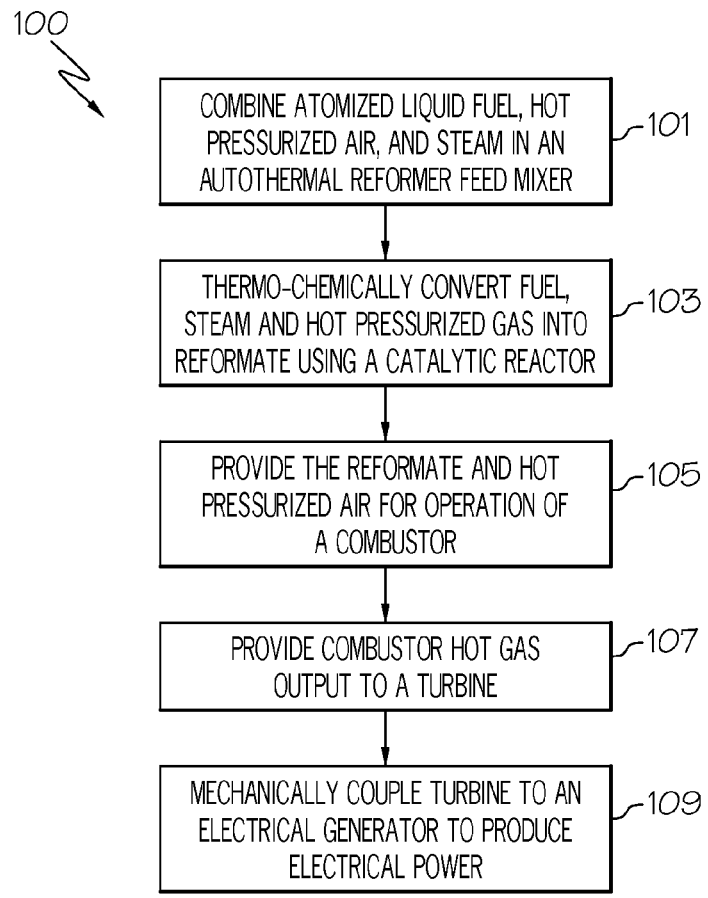
FIG. 3 is a flow diagram illustrating operation of the auxiliary power unit of FIG. 2, in accordance with the present invention.
Figure 4:
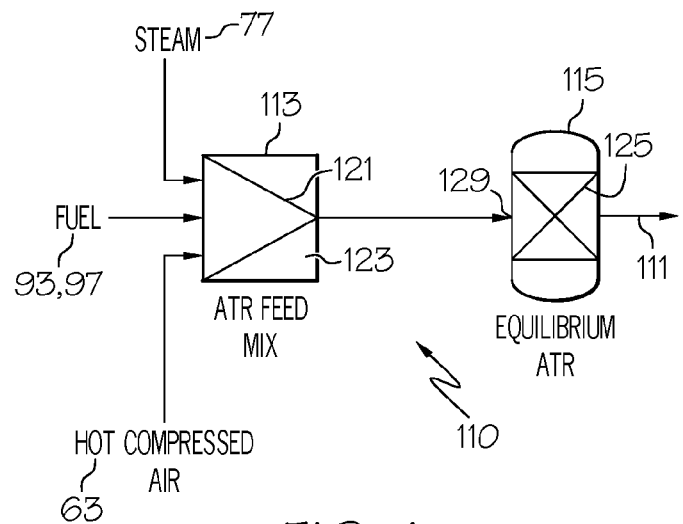
FIG. 4 is a functional diagram of an auxiliary power unit for producing electrical power from a fuel, the power unit including an autothermal reformer for producing a reformate from the fuel, in accordance with the present invention.

With continuing reference to FIG. 2 and with additional reference to the flow diagram 100 of FIG. 3 and to the detail illustrations of FIG. 4, the liquid fuel 93 (or the low-sulfur content fuel 97) may be atomized and combined with the steam 77 and the hot compressed air 63 in an autothermal reformer feed mixer 113, at step 101. The fuel-steam-gas mixture in the autothermal reformer feed mixer 113 may be output to an equilibrium autothermal reformer 115 that includes a catalytic reactor, as described in greater detail below. The catalytic reactor operates to thermo-chemically convert fuel-steam-gas mixture into a reformate 111, at step 103. The reformate 111 may be provided to the combustor 49 as fuel for operation of the turbine 41, as shown in the system diagram of FIG. 2.

As explained in greater detail below, the reformate 111 may comprise hydrogen, carbon dioxide, carbon monoxide, steam, and various hydrocarbons. In accordance with the present invention, the reformate 111 may be used to power operation of the combustor 49 in the hydrogen auxiliary power unit 40, at step 105. The hot compressed air 63 from the recuperator 53 may be provided to the combustor 49 to provide for a more complete combustion process which thus may reduce the amount of undesirable compounds, such as $NO_x$, in the combustion products, in comparison to amount of such compounds found in the exhaust composition of a conventional turbine power unit, such as the auxiliary power system 10 described above. The hot gas 47 outputted by the combustor 49 may be used to power the turbine 41, at step 107. The turbine power, in turn, may be used to power either or both of the electrical generator 43 and the air compressor 45, at step 109.

Referring to FIG. 4, the autothermal reformer mixer 113 may include a fuel atomizer 121 in a mixing section 123. The equilibrium autothermal reformer mixer 123 may interface with catalyst bed and an igniter, such as a glow plug. During operation of the autothermal reformer 110, the liquid fuel 93 (or 97), the steam 77, and the hot compressed air 63 may be injected through a nozzle 129 directly into a plenum 131 of the catalytic reactor in the equilibrium autothermal reformer 115.

In an exemplary embodiment, the flow of the liquid fuel 93 (or 97), the steam 77, and the hot compressed air 63 may be controlled so as to produce a ratio of oxygen to carbon in the reformate 111 of about 1.1 to 1, and a ratio of steam to carbon of about 1.1 to 1, where the fuel is JP-8 jet fuel. Under such operating conditions, the reformate 111 may be provided to the combustor 49 at a temperature of about 900° C. and yield a conversion process efficiency of about 72%. The resulting composition of the reformate 111 delivered to the combustor 49 may comprise about 23% $H_2$, 40% $N_2$, 0.3% $CH_4$, 13% CO, 7% $CO_2$, and 17% $H_2O$, where the $H_2$ in the composition of the reformate 111 may be derived from the steam 77 and the liquid fuel 93 (or 97).

Alternatively, where the fuel is diesel fuel, the flow of the liquid fuel 93 (or 97), the steam 77, and the hot compressed air 63 may be controlled so as to produce a ratio of oxygen to carbon in the reformate 111 of about 0.9:1 to 1.2:1, and a ratio of steam to carbon of about 0.0:1 to 2.0:1. Under such operating conditions, the reformate 111 may be provided to the combustor 49 at a temperature of about 840-920° C. and yield a conversion process efficiency of about 37-72%. The resulting composition of the reformate 111 delivered to the combustor 49 comprises about 14-21% $H_2$, 36-58% $N_2$, 0.0-1.8% $CH_4$, 8-17% CO, 4-9% $CO_2$, and 3-26% $H_2O$.

As can be appreciated by one skilled in the relevant art, the presence of $H_2$ in the reformate 111, as disclosed in the present invention, may serve to promote the rapid and more nearly complete combustion of the fuel 93 (or 97) delivered to the combustor 49 as part of the reformate 111 and thus may result in lower gas emissions, in comparison to conventional turbine-powered electrical generation systems. Moreover, in comparison to other types of reformers, the autothermal reformer 110 may require smaller quantities of water when operating, may be more resistant to coking, may operate with lower reactor temperatures, may serve to improve system conversion efficiency, and may be less sensitive to variations in fuel atomization and mixing.

In an alternative embodiment, the hydrogen auxiliary power unit 40 may comprise a catalytic partial oxidation reformer (not shown) and may use fuel comprising any of natural gas, propane, gasoline, Jet A jet fuel, JP-8 jet fuel, or diesel fuel in the catalytic partial oxidation reformer to provide reformate to the combustor 49. It can be appreciated by one skilled in the relevant art that a catalytic partial oxidation process uses only air and vaporized fuel, but may have limited operational life from running at relatively high temperatures and incurring soot formation.

In yet another alternative embodiment, the hydrogen auxiliary power unit 40 may comprise an oxidative steam reformer (not shown) and may use low molecular weight fuels, such as methanol and methane, in the oxidative steam reformer to provide reformate to the combustor 49. Operation of the oxidative steam reformer may require about three pounds of water for every one pound of fuel.

In yet another alternative embodiment, the combustor 49 may comprise a catalytic combustor such that the combustible mixture of hydrogen and air are reacted using a catalyst substrate instead of burning in a volumetric flame. It can be appreciated by one skilled in the relevant art that, operating the catalytic combustor with hydrogen will reduce the amount of $NO_x$ that may be produced by the action of combustion.

It should be understood, of course, that the foregoing relates to exemplary embodiments of the invention and that modifications may be made without departing from the spirit and scope of the invention as set forth in the following claims.

I claim:

1. An auxiliary power unit comprising:
   a fuel reforming catalytic reactor for producing a reformate from a mixture of fuel, steam, and compressed air;
   a combustor for consuming said reformate and producing thermal energy therefrom;
   a turbine powered by said combustor;
   an air compressor mechanically coupled to said turbine;
   a recuperator receiving exhaust from the turbine, the recuperator conducting thermal energy from said turbine exhaust to compressed air from said air compressor to provide a hot compressed air to the combustor;
   an electrical generator mechanically coupled to said turbine;
   a condenser cooled by ambient air for condensing an exhaust gas from said turbine to produce liquid water; and
   a steam generator for using heat from said exhaust gas produced by said turbine to produce said steam from said liquid water,
   wherein said recuperator is adapted to provide a portion of said hot compressed air to said fuel reforming catalytic reactor.

2. The auxiliary power unit of claim 1 wherein said combustor comprises a catalytic combustor for burning said reformate so as to reduce pollutants.

3. The auxiliary power unit of claim 1 further comprising a desulfurizer for reducing sulfur content in said fuel delivered to said fuel reforming catalytic reactor.

4. The auxiliary power unit of claim 1 wherein said fuel reforming catalytic reactor comprises one of an autothermal reformer, a catalytic partial oxidizer, and an oxidative steam reformer.

5. The auxiliary power unit of claim 4 further wherein said autothermal reformer comprises:
   a feed mixer; and
   an equilibrium autothermal reformer.

6. The hydrogen auxiliary power unit of claim 5 wherein said feed mixer comprises a substrate for atomizing said fuel.

7. The hydrogen auxiliary power unit of claim 1 wherein said fuel comprises a member of the group consisting of JP8 jet fuel, gasoline, Jet A jet fuel, diesel fuel, natural gas, propane, methanol, and methane.

8. The hydrogen auxiliary power unit of claim 1 wherein said reformate comprises hydrogen, nitrogen, methane, carbon monoxide, carbon dioxide, and steam.

9. A auxiliary power unit for producing electrical power from a fuel, said power unit comprising:
- an autothermal reformer for producing a reformate from the fuel, said reformate including at least one of hydrogen, nitrogen, methane, carbon monoxide, carbon dioxide, and steam;
- a turbine disposed in a structure;
- a combustor for burning said reformate to power said turbine, said turbine for flowing turbine exhaust through a recuperator;
- an air compressor for providing compressed ambient air to said recuperator, said recuperator for conducting thermal energy from said turbine exhaust to said compressed ambient air, such that resultant hot compressed air is available to said combustor;
- a steam generator for receiving said turbine exhaust after expulsion from said recuperator, said steam generator further for transferring thermal energy from said turbine exhaust to a water supply to produce said steam;
- a condenser for receiving said turbine exhaust after expulsion from said steam generator, said condenser for cooling said turbine exhaust to produce said water supply; and
- an electrical generator mechanically coupled to said turbine for producing electrical power,
- wherein said recuperator is adapted to provide a portion of said hot compressed air to said reformer.

10. The power unit of claim 9 wherein said structure comprises a member of the group consisting of an aircraft, a helicopter, a truck, a tank, a residential home, an apartment, a store, a mall, a dining establishment, a hospital, and a remote off-the-grid site.

* * * * *